United States Patent
Eum et al.

(10) Patent No.: US 8,302,118 B2
(45) Date of Patent: Oct. 30, 2012

(54) OPTICAL DISC DRIVE HAVING A BALANCER MOUNTED ON A DECK

(75) Inventors: Jae Yong Eum, Suwon-si (KR); Bong Joo Kim, Suwon-si (KR); Young yun Seol, Seoul (KR); Hong Kyun Yim, Suwon-si (KR); Jin Hyung Lee, Suwon-si (KR); Jun Tae Park, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1275 days.

(21) Appl. No.: 12/041,815

(22) Filed: Mar. 4, 2008

(65) Prior Publication Data

US 2008/0229348 A1 Sep. 18, 2008

(30) Foreign Application Priority Data

Mar. 12, 2007 (KR) ........................ 10-2007-0024225

(51) Int. Cl.
*G11B 7/00* (2006.01)
(52) U.S. Cl. ........................................... 720/692
(58) Field of Classification Search .................. 720/679, 720/681, 693, 694; 369/44.32, 53.18, 139, 369/247.1, 263.1
See application file for complete search history.

(56) References Cited

U.S. PATENT DOCUMENTS

| 6,125,097 | A | * | 9/2000 | Wu ............................... 720/692 |
| 2001/0021155 | A1 | * | 9/2001 | Saito ........................... 369/75.1 |
| 2004/0128678 | A1 | * | 7/2004 | Yoshino et al. ............... 720/657 |
| 2005/0055706 | A1 | * | 3/2005 | Omori et al. .................. 720/700 |
| 2005/0132393 | A1 | * | 6/2005 | Omori et al. .................. 720/669 |
| 2005/0210482 | A1 | * | 9/2005 | Amitani ........................ 720/611 |

FOREIGN PATENT DOCUMENTS

| JP | 2003068067 A | * | 3/2003 |
| KR | 2005-94639 | | 10/2005 |

OTHER PUBLICATIONS

Machine-Assisted Translation of JP 2003068067 A.*

* cited by examiner

*Primary Examiner* — Nathan Danielsen
(74) *Attorney, Agent, or Firm* — Stanzione & Kim, LLP

(57) ABSTRACT

An optical disc drive includes a traverse deck having left and right sides to be balanced. The optical disc drive includes a main deck, a tray, a turntable, an optical pickup, a traverse deck, and a balancer. The optical pickup is mounted movably in the back-and-forth direction to emit light to an optical disc placed on the turntable to read and write information from and to the optical disc. On the traverse deck, the turntable is mounted at the front side of the traverse deck and the optical pickup is mounted movably in the back-and-forth direction. The balancer is mounted on the traverse deck to balance the weights of the left and right sides of the traverse deck.

15 Claims, 4 Drawing Sheets

OPTICAL DISC DRIVE HAVING A BALANCER MOUNTED ON A DECK

CROSS-REFERENCE TO RELATED APPLICATIONS

This application claims priority under 35 U.S.C. §119(a) from Korean Patent Application No. 2007-0024225, filed on Mar. 12, 2007 in the Korean Intellectual Property Office, the disclosure of which is incorporated herein by reference in its entirety.

BACKGROUND OF THE INVENTION

1. Field of the Invention

The present general inventive concept relates to an optical disc drive, and more particularly, to an optical disc drive designed such that left and right sides of a traverse deck can be balanced.

2. Description of the Related Art

A conventional optical disc drive is an apparatus that emits light to an optical disc such as a compact disc (CD) and a digital versatile disc (DVD) to write information to the optical disc or to read information stored in the optical disc.

Korean Patent Application Publication No. 10-2005-0094639 discloses a conventional optical disc drive including a main deck, a tray that is mounted movably in a back-and-forth direction on the main deck to load or unload an optical disc into or from the main deck, an optical pickup that is mounted movably in the back-and-forth direction to write or read information to or from the optical disc being rotated by a turntable while it moves back and forth, an optical pickup transport device to move the optical pickup in the back-and-forth direction, and a traverse deck on which a turntable is mounted at a front portion of the traverse deck and the optical pickup transport device is mounted at one side of the traverse deck.

However, the weights of the left and right sides of the traverse deck are different since the optical pickup transport device is mounted on one of the left or right sides of the traverse deck. The side of the traverse deck, which is relatively heavy since the optical pickup transport device is mounted on it, vibrates with relatively small amplitudes, whereas the other side of the traverse deck, which is relatively light, vibrates with relatively large amplitudes. Thus, the left and right sides of the traverse deck vibrate with different amplitudes. This makes the rotation of the optical disc and the turntable mounted on the traverse deck unstable, thereby causing vibrations and noise.

SUMMARY OF THE INVENTION

The present general inventive concept provides an optical disc drive that reduces a difference between weights of left and right sides of a traverse deck in the optical disc drive, thereby reducing vibrations of the traverse deck.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an optical disc drive including a main deck, a tray mounted movably in a back-and-forth direction on the main deck to load and unload an optical disc into and from the main deck, a turntable to rotate an optical disc placed on the turntable, an optical pickup mounted movably in the back-and-forth direction to emit light to the optical disc placed on the turntable to read and write information from and to the optical disc, a traverse deck on which the turntable is mounted at a front side of the traverse deck and the optical pickup is mounted movably in the back-and-forth direction, and a balancer mounted on the traverse deck to balance weights of left and right sides of the traverse deck.

The optical disc drive may further include an optical pickup transport device mounted on one of the left or right sides of the traverse deck to move the optical pickup in the back-and-forth direction, and the balancer is mounted on the other side of the traverse deck.

The optical pickup transport device may include a transport motor to produce a torque and a transport screw that is rotated forward and backward by the transport motor to move the optical pickup in the back-and-forth direction.

The optical pickup transport device may include a transport bracket extending in the back-and-forth direction and being mounted on the one of the left or right sides of the traverse deck, the transport motor and the transport screw being mounted on the transport bracket.

The transport screw may be mounted in front of the transport motor and a rear side of the balancer is heavier than a front side of the balancer.

The balancer may have a uniform thickness and the rear side of the balancer is wider than the front side of the balancer.

The balancer may have a through hole formed therein to fasten a fastening member to the traverse deck through the through hole.

The through hole may be elongated in the back-and-forth direction.

The through hole may include a pair of through holes that are formed in the balancer at front and rear sides of the balancer, respectively, and the fastening member includes a pair of fastening members that are fastened to the traverse deck through the pair of through holes to fix the front and rear sides of the balancer to the traverse deck, respectively.

A plurality of scale items may be marked at regular intervals on a portion of the balancer adjacent to the through hole.

A plurality of scale items indicating fastening positions of the fastening member according to models may be marked at intervals along the back-and-forth direction on a portion of the balancer adjacent to the through hole.

A circular auxiliary through hole may be formed at a center portion of the balancer to fasten a fastening member to the traverse deck through the auxiliary through hole, and a pair of support protrusions may project upwardly from the traverse deck at front and rear portions on the other side of the traverse deck to support front and rear sides of the balancer, respectively.

The foregoing and/or other aspects and utilities of the present general inventive concept may also be achieved by providing an optical disc drive including a main deck, a tray mounted movably in a back-and-forth direction on the main deck to load and unload an optical disc into and from the main deck, a turntable to rotate an optical disc placed on the turntable, an optical pickup mounted movably in the back-and-forth direction to emit light to the optical disc placed on the turntable to read and write information from and to the optical disc, a traverse deck on which the turntable is mounted at a front side of the traverse deck and the optical pickup is mounted movably in the back-and-forth direction, an optical pickup transport device mounted on one of left or right sides of the traverse deck to move the optical pickup in the backand-forth direction, and a balancer mounted on the other side of the traverse deck to balance weights of the left and right sides of the traverse deck.

The foregoing and/or other aspects and utilities of the present general inventive concept may also be achieved by providing an optical disc drive including a deck unit, a pickup unit movably installed on the deck unit to move in a direction, and a balancer mounted on the deck unit to balance a weight difference of both sides of one of the pickup unit and the deck unit.

The optical disc drive may further include a transport unit to transport the pickup unit in the direction, and the balancer may have a length in the direction to balance the weight difference.

The transport unit ma be disposed in the direction and may have a weight varying in the direction; and the balancer has a weight varying in the direction.

The pickup unit may have a weight varying in the direction, and the balancer may have the weight varying in the direction to correspond to the weight difference of the weights of the transport unit and the pickup unit.

The both sides of the pickup unit may include a first side to be supported by a first end of the deck unit and a second side to be supported by a second end of the deck unit, the second side of the pickup unit to be connected to the transport unit such that the transport unit moves the pickup unit in the direction, and the second side to be heavier than the first side, and the balancer may have the weight varying in the direction to correspond to the weight difference of the weights of the transport unit and the pickup unit.

The pickup unit may have a weight varying in a direction perpendicular to the direction, and the balancer may have a weight varying in the direction.

The balancer may include a first hole and a second hole formed in the direction, and may further include a scale formed adjacent to one of the first hole and the second hole.

The deck unit may include one or more support protrusions, and the balancer may include one or more holes to correspond to the one or more support protrusions, and may further include an auxiliary hole through which the balancer is coupled to the deck unit when the one or more support protrusions are disposed in the corresponding holes.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
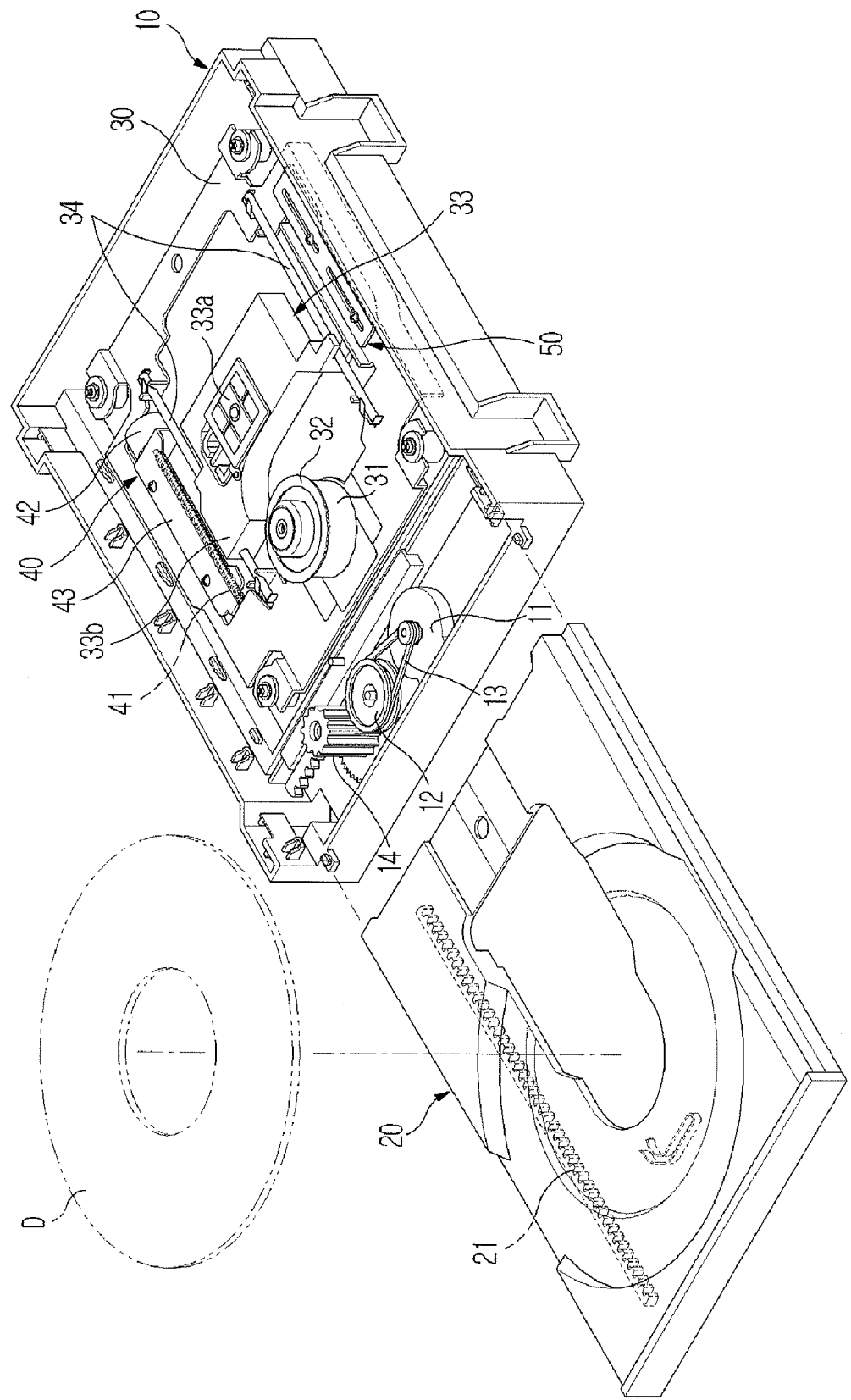
FIG. 1 is a perspective view illustrating an optical disc drive according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

As illustrated in FIG. 1, an optical disc drive according to an embodiment of the present general inventive concept includes a main deck 10 having a front opening and a tray 20 that is mounted on the main deck 10 such that it is movable back and forth. The tray 20 loads or unloads an optical disc (or disk) D into or from the main deck 10 through the front opening of the main deck 10.

A loading device to slide the tray 20 in the back-and-forth direction is mounted on a front bottom side of the main deck 10. The loading device includes a loading motor 11 to produce a torque and a pulley 12, a belt 13, and a pinion gear 14 to transfer motive power of the loading motor 11 to the tray 20. A rack gear 21 is formed on one side of the bottom of the tray 20 to receive the motive power from the pinion gear 14 and then to cause the tray 20 to make a linear motion in the back-and-forth direction.

A traverse deck 30, on which various parts to write and read data to and from the optical disc D are mounted, is hinged to an inner portion of the main deck 10 such that the traverse deck 30 is rotatable in the vertical direction. A turntable 32 and an optical pickup 33 are mounted on the traverse deck 30. A spindle motor 31 rotates the turntable 32 on which the optical disc D is placed after being delivered into the main deck 10. The optical pickup 33 writes information to the optical disc D that has been loaded into the main deck 10 through the turntable 32 or reads information stored in the optical disc D.

Although the traverse deck is spaced-apart from the main deck 10 and mounted on the main deck 10, the main deck 10 and the traverse deck 30 can be referred to as a deck unit on which the above-described elements are mounted in a stationary state and/or a movable state.

The optical pickup 33 includes an actuator 33a to handle inclination and eccentricity of the rotating optical disc D and a pickup base 33b on which the actuator 33a and various optical parts are mounted. The optical pickup 33 is mounted movably in the back-and-forth direction on the traverse deck 30 and emits light to a recording surface of the optical disc D while moving in the back-and-forth direction. A pair of pickup shafts 34, each extending in the back-and-forth direction, are mounted on both sides of the traverse deck 30, respectively. Both sides of the pickup base 33b are mounted on the pair of pickup shafts 34, respectively, such that the back-and-forth movement of the optical pickup 33 is guided by the pickup shafts 34.

An optical pickup transport device 40 is provided on the traverse deck 30 at one of the left or right sides of the traverse deck 30 to move the optical pickup 33 in the back-and-forth direction. The optical pickup transport device 40 includes a transport screw 41, a transport motor 42, and a transport bracket 43. The transport screw 41 is rotatably connected to one side of the pickup base 33b of the optical pickup 33 to transfer motive power of the transport motor 42 to the optical pickup 33 such that the optical pickup 33 moves in the back-and-forth direction as the transport screw 41 rotates. The transport motor 42 is mounted on a rear end of the transport screw 41 to produce a torque to rotate the transport screw 41. The transport screw 41 and the transport motor 42 are mounted on the transport bracket 43, which is fixed to one side of the traverse deck 30 to mount the transport screw 41 and the transport motor 42 to the traverse deck 30.

The optical disc drive also includes a balancer 50 which has a specific weight such that the weights of the left and right sides of the traverse deck 30 are balanced. The balancer 50 having a weight corresponding to that of the optical pickup transport device 40 is mounted on the side of the traverse deck 30 opposite to the other side, on which the optical pickup transport device 40 is mounted. Thus, the weight of the optical pickup transport device 40 mounted on one side of the traverse deck 30 is balanced with the weight of the balancer 50 mounted on the opposite side of the traverse deck 30. Therefore, even if vibrations produced during rotation of the turntable 32 are transferred to the traverse deck 30, the left and right sides of the traverse deck 30 vibrate with substantially the same amplitudes to stabilize the rotation of the turntable 32 and the optical disc D, thereby reducing the level of vibrations and noise.

The following is a table describing measurements of the level of noise generated at the optical disc drive according to the rotation speed of the turntable 32 before and after the balancer 50 is installed.

| Rotation Rate (RPM) | Noise before balancer is mounted (dB) | Noise after balancer is mounted (dB) |
|---|---|---|
| 1000 | 22.2 | 22 |
| 2000 | 23.5 | 23 |
| 3000 | 31 | 29.7 |
| 4000 | 41.2 | 37.8 |
| 5000 | 51.8 | 41.5 |
| 6000 | 57.5 | 47.6 |
| 7000 | 59.1 | 49.5 |
| 8000 | 60.7 | 52.5 |

Figure 2:
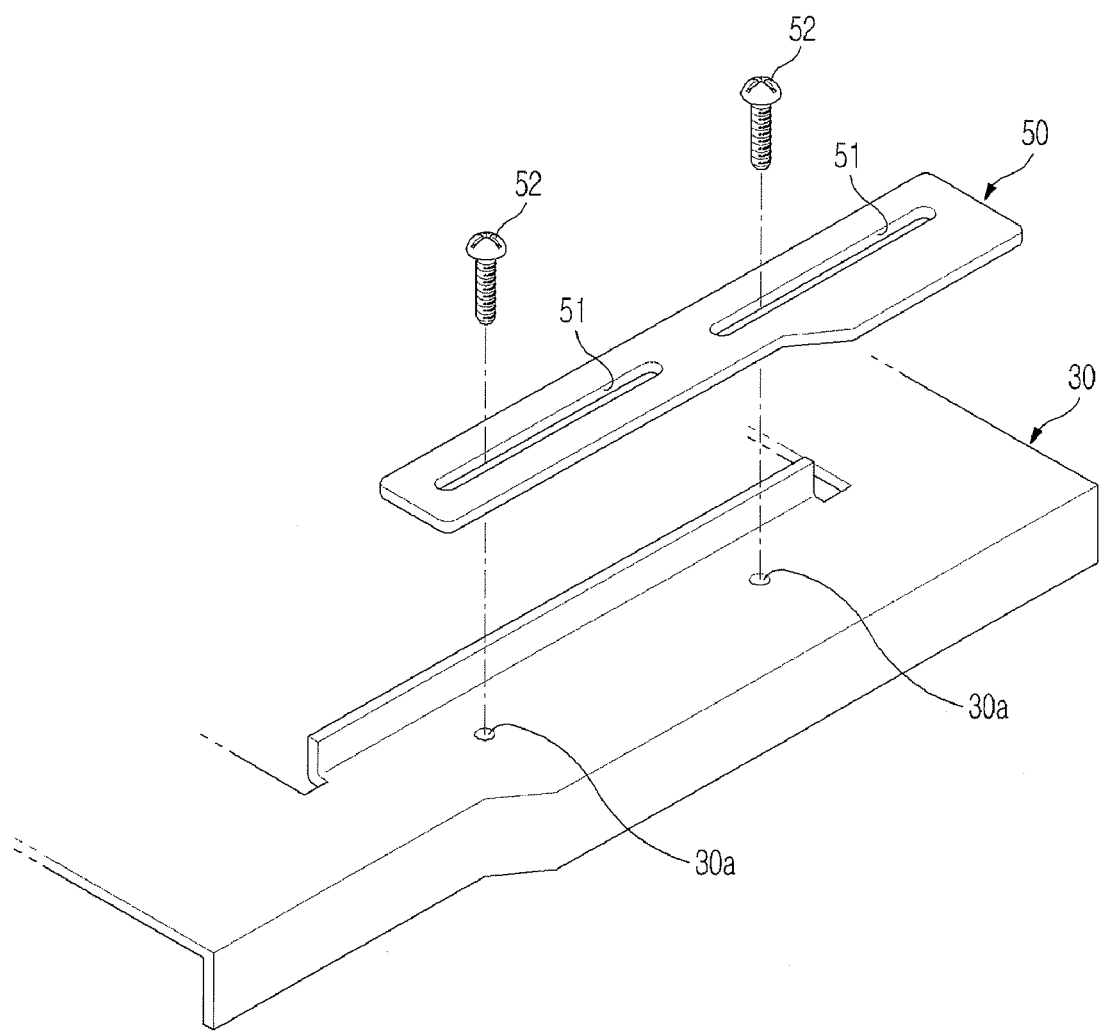
FIG. 2 is a perspective view illustrating a mounting structure of a balancer in the optical disc drive of FIG. 1.

When the motor 42 is mounted on the rear ends of the transport bracket 43 and the transport screw 41, the balancer 50 may be formed such that a rear side of the balancer 50 has a greater weight than that of a front side of the balancer 50 to cope with the weight distribution of the optical pickup transport device 40 as illustrated in FIG. 2. In order for the balancer 50 to have the rear side having a greater weight than that of the front side, the balancer 50 is formed such that it has a uniform thickness throughout while the rear side has a larger width than that of the front side.

It is possible that the rear side of the balancer 50 has a thickness thicker than that of the front side when widths of the rear and front sides of the balancer 50 are same. It is also possible that the balancer 50 may have a length to correspond to a length of the transport device 40 in a direction, for example, the back-and-forth direction of the optical pickup 33. The length of the balancer may be shorter or longer that the length of the transport device 40 according to at least one of the width and thickness.

Accordingly, when the transport device 40 is disposed on a first side of the traverse deck 30 with respect to the optical pickup 33, the balancer 50 is disposed on a second side of the traverse deck 30 opposite to the first side of the traverse deck 30 with respect to the optical pickup 33. Also, when the transport device 40 has the weight distribution with a first weight and a second weight disposed along a direction, such as the back-and-forth direction in which the optical pickup 33 moves, the balancer 50 can have a third weight and a fourth weight to be disposed along the direction.

As described in FIG. 1, the optical pickup 33 has opposite ends to be movably connected to the pickup shaft 34, and one of the opposite ends of the optical pickup 33 has a weight heavier than a weight of the other one of the opposite ends of the optical pickup 33 since the one of the opposite ends of the optical pickup 33 is connected to the transport device 40 to receive a transporting force from the transport device 40 to move in the back-and-forth direction. In this case, when the optical pickup 33 has another weight distribution with a fifth weight corresponding to the one of the opposite ends and a sixth weight corresponding to the other opposite end and disposed along a direction having an angle with the direction of the weight distribution of the transport device 40, for example, a direction perpendicular to the direction of the weight distribution of the transport device 40 or the back-and-forth direction of the optical pickup 33, the balancer 50 can have a seventh weight and an eighth weight to correspond to the another weight distribution of the optical pickup 33.

The balancer 50 is fixed to the traverse deck 30 through a fastening member 52 such as a screw used for fastening. To accomplish this, a through hole 51 is formed in the balancer 50 to mount the fastening member 52 through the through hole 51 and a fastening hole 30a is formed in the traverse deck 30 to fasten the tip of the fastening member 52 into the fastening hole 30a. The balancer 50 is fixed to the traverse deck 30 by fastening the fastening member 52 into the fastening hole 30a through the through hole 51.

This balancer 50 can be applied to various types of optical disc drives. The mounting position of the transport motor 42 and the length of the transport screw 41 may vary depending on the model of the optical disc drive. Accordingly, the through hole 51 formed in the balancer 50 applied to the optical disc drive according to the invention is elongated in the back-and-forth direction so that, only by changing the mounting position of the balancer 50 in the back-and-forth direction, the balancer 50 can be applied without structural change to any optical disc drive of various models with different mounting positions of the transport motor 42 or with different lengths of the transport screw 41.

Figure 3:
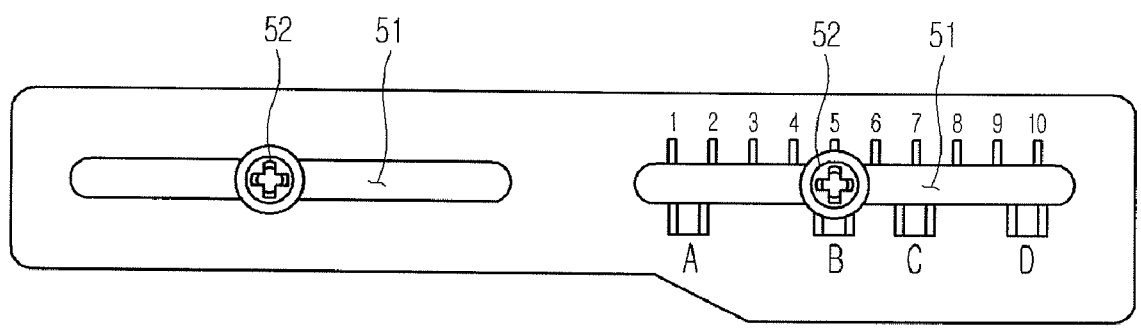
FIG. 3 is a plan view illustrating the balancer of the optical disc drive of FIG. 1.

As illustrated in FIG. 3, scale items 1, 2, 3, ..., 9, and 10 are marked at intervals along the back-and-forth direction on a first portion of the balancer 50 adjacent to the through hole 51 to allow the user to easily determine the position at which the fastening member 52 is to be fastened. In this embodiment, a number of scale items are marked at regular intervals on the balancer 50 at one side of the through hole 51 and scale items indicating the fastening positions of the fastening member 52 according to the models are marked on a second portion of the balancer 50 at the opposite side of the through hole 51.

More specifically, in this embodiment, a pair of through holes 51 are formed in parallel in the back-and-forth direction in the balancer 50 at front and rear sides of the balancer 50, respectively, and the front and rear sides of the balancer 50 are fastened by a pair of fastening members 52, and scale items are marked on portions of the through hole 51 formed at the rear side of the balancer 50 with a greater width than the front side.

Figure 4:
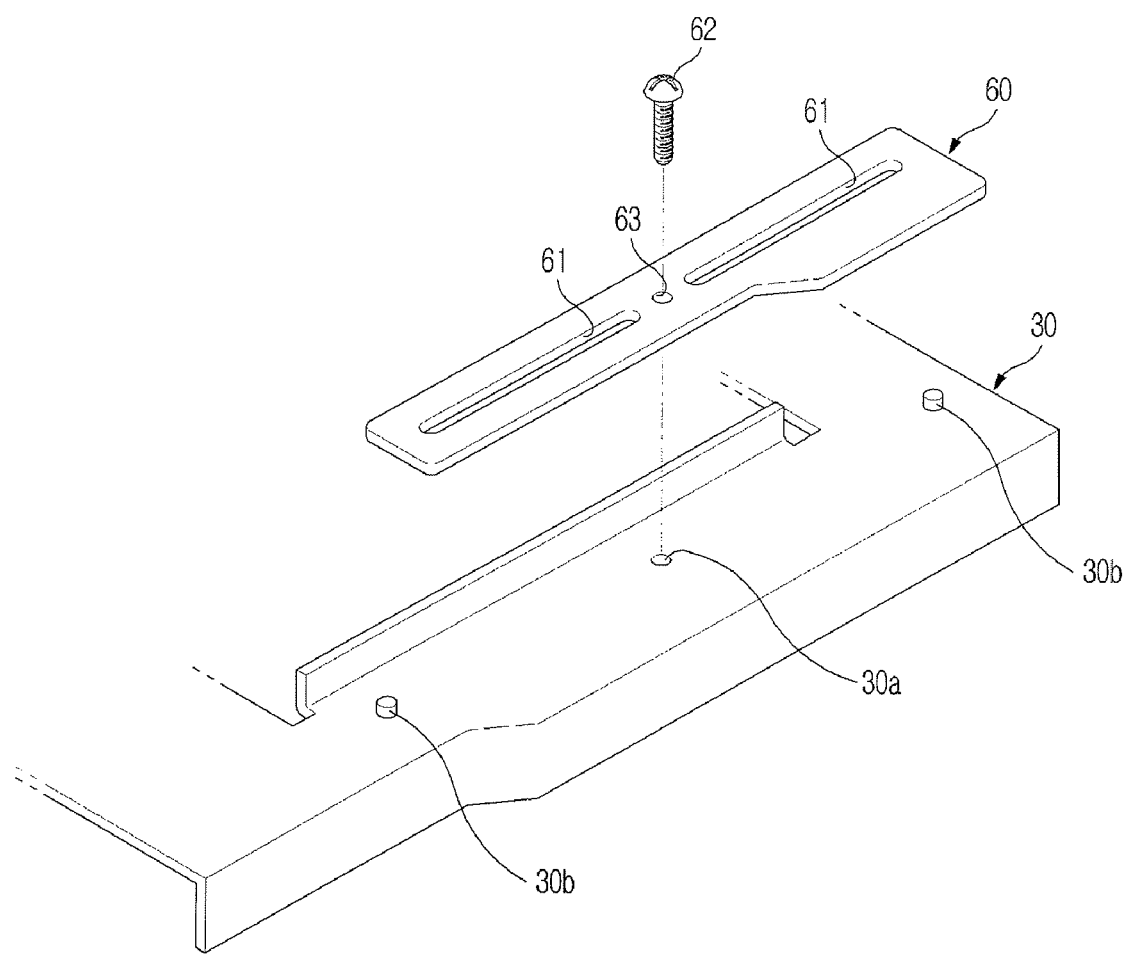
FIG. 4 is a perspective view illustrating a mounting structure of a balancer usable with an optical disc drive according to an embodiment of the present general inventive concept.

FIG. 4 illustrates a balancer 50 usable with an optical disc drive according to an embodiment of the general inventive concept.

The balancer 60 applied to the optical disc drive according to an embodiment of the general inventive concept is designed to be easily fixed to the traverse deck 30 through a single fastening member 62. A circular auxiliary through hole 63, through which the fastening member 62 is mounted, is formed at a center portion of the balancer 60 between a pair of through holes 61 formed in the balancer 60. A pair of support protrusions 30b project upwardly from the traverse deck 30 at front and rear portions on the side of the traverse deck 30 opposite to the other side, on which the optical pickup transport device 40 is mounted, to support the front and rear sides of the balancer 60, respectively. The balancer 60 is then fitted between the two support protrusions 30b such that front and rear ends of the balancer 60 are supported by the two support protrusions 30*b*, respectively. The fastening member 62 is then fastened to the traverse deck 30 through the auxiliary through hole 63, thereby fixing the balancer 60 to the traverse deck 30. Thus, this embodiment achieves the fixing of the balancer 60 to the traverse deck 30, simply through the single fastening member 62.

As is apparent from the above description, the present general inventive concept provides an optical disc drive with a variety of features and advantages. For example, a balancer is mounted on one of the left or right sides of a traverse deck, which is opposite to the other side, on which an optical pickup transport device is mounted, thereby balancing the left and right sides of the traverse deck. This stabilizes the rotation of a turntable and an optical disc placed on the turntable, thereby reducing vibrations and noise produced during an operation of the optical disc drive.

Although a few embodiments of the present general inventive concept have been shown and described, it would be appreciated by those skilled in the art that changes may be made in these embodiments without departing from the principles and spirit of the general inventive concept, the scope of which is defined in the appended claims and their equivalents.

What is claimed is:

1. An optical disc drive comprising:
    a main deck;
    a tray mounted movably in a back-and-forth direction on the main deck to load and unload an optical disc into and from the main deck;
    a turntable to rotate an optical disc placed on the turntable;
    an optical pickup mounted movably in the back-and-forth direction to emit light to the optical disc placed on the turntable to read and write information from and to the optical disc;
    a traverse deck on which the turntable is mounted at a front side of the traverse deck and the optical pickup is mounted movably in the back-and-forth direction; an optical pickup transport device mounted on one of the left and right sides of the traverse deck to move the optical pickup in the back-and-front direction; and
    a balancer mounted on the traverse deck to balance weights of left and right sides of the traverse deck with respect to the optical pickup,
    wherein the balancer is mounted on the other one of left and right sides of the traverse deck and is slidably movable in the back-and-front direction with respect to the traverse deck, and
    wherein a through hole is formed in the balancer to fasten a fastening member to the traverse deck through the through hole and the through hole is elongated in the back-and-forth direction.

2. The optical disc drive of claim 1, wherein the optical pickup transport device includes a transport motor to produce a torque and a transport screw that is rotated forward and backward by the transport motor to move the optical pickup in the back-and-forth direction.

3. The optical disc drive of claim 2, wherein:
    the transport screw is mounted in front of the transport motor; and
    a rear side of the balancer is heavier than a front side of the balancer.

4. The optical disc drive of claim 3, wherein the balancer has a uniform thickness and the rear side of the balancer is wider than the front side of the balancer.

5. The optical disc drive of claim 1, wherein the optical pickup transport device includes a transport bracket extending in the back-and-forth direction and being mounted on the one of the left or right sides of the traverse deck, the transport motor and the transport screw being mounted on the transport bracket.

6. The optical disc drive of claim 1, wherein:
    the through hole includes a pair of through holes that are formed in the balancer at front and rear sides of the balancer, respectively; and
    the fastening member includes a pair of fastening members that are fastened to the traverse deck through the pair of through holes to fix the front and rear sides of the balancer to the traverse deck, respectively.

7. The optical disc drive of claim 1, wherein a plurality of scale items are marked at regular intervals on a portion of the balancer adjacent to the through hole.

8. The optical disc drive of claim 1, wherein the balancer comprises a plurality of scale items marked at intervals along the back-and-forth direction on a portion of the balancer adjacent to the through hole to indicate fastening positions of the fastening member according to models.

9. The optical disc drive of claim 1, wherein:
    a circular auxiliary through hole is formed at a center portion of the balancer to fasten a fastening member to the traverse deck through the auxiliary through hole; and
    a pair of support protrusions project upwardly from the traverse deck at front and rear portions on the other side of the traverse deck to support front and rear sides of the balancer, respectively.

10. An optical disc drive comprising:
    a main deck;
    a tray mounted movably in a back-and-forth direction on the main deck to load and unload an optical disc into and from the main deck;
    a turntable to rotate an optical disc placed on the turntable;
    an optical pickup mounted movably in the back-and-forth direction to emit light to the optical disc placed on the turntable to read and write information from and to the optical disc;
    a traverse deck on which the turntable is mounted at a front side of the traverse deck and the optical pickup is mounted movably in the back-and-forth direction;
    an optical pickup transport device mounted on one of left or right sides of the traverse deck to move the optical pickup in the back-and-forth direction; and
    a balancer mounted on the other side of the traverse deck to balance weights of the left and right sides of the traverse deck and to be slidably movable in the back-and-front direction with respect to the traverse deck,
    wherein a through hole is formed in the balancer to fasten a fastening member to the traverse deck through the through hole and the through hole is elongated in the back-and-forth direction.

11. An optical disc drive comprising:
    a deck unit;
    a pickup unit movably installed on the deck unit to move in a direction;
    a transport unit to transport the pickup unit in the direction; and
    a balancer mounted on the deck unit to balance a weight difference of both sides of one of the pickup unit and the deck unit and to be slidably movable in the back-and-front direction with respect to the deck unit,
    wherein the transport unit is mounted on one of the left and right sides of the deck unit, and the balancer is mounted on the other one of the left and right sides of the deck unit, and wherein a through hole is formed in the balancer to fasten a fastening member to the traverse deck through the through hole and the through hole is elongated in the back-and-forth direction.

12. The optical disc drive of claim 11, wherein the balancer has a length in the direction to balance the weight difference.

13. The optical disc drive of claim 12, wherein:
the transport unit is disposed in the direction and has a weight varying in the direction; and
the balancer has a weight varying in the direction.

14. The optical disc drive of claim 12, wherein:
the pickup unit has a weight varying in the direction; and
the balancer has the weight varying in the direction to correspond to the weight difference of the weights of the transport unit and the pickup unit.

15. The optical disc drive of claim 11, wherein the balancer comprises a first hole and a second hole formed in the direction, and further comprises a scale formed adjacent to one of the first hole and the second hole.

* * * * *